United States Patent Office 3,143,571
Patented Aug. 4, 1964

3,143,571
FORMAMIDINIUM SALTS
David H. Clemens, Willow Grove, Pa., assignor to Rohm & Haas Company, Philadelphia, Pa., a corporation of Delaware
No Drawing. Filed Oct. 17, 1961, Ser. No. 145,736
9 Claims. (Cl. 260—564)

This invention relates to formamidinium fluoroborates and to methods for making them.

This application is a continuation-in-part of application Serial No. 89,900, filed February 17, 1961.

The formamidinium fluoroborates of the invention may be represented by the following formula:

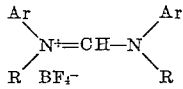

in which R represents an aliphatic hydrocarbon group, such as an alkyl group or an alkaryl group, and Ar represents an aromatic hydrocarbon group, such as an aryl group. Typical groups which R may represent include an alkyl group which may be straight or branched, or a cycloalkyl group. Typical alkyl groups include methyl, ethyl, cyclohexyl, isopropyl, 2-ethylhexyl, n-octyl, isononyl, 2-methylcyclohexyl, dodecyl, 2,2,5-trimethyloctyl, tetradecyl, octadecyl, benzyl, ethylbenzyl, and the like. The group Ar represents an aromatic hydrocarbon group, such as phenyl, naphthyl and the like. The aryl group may, optionally, be substituted with inert substituents, such as alkyl, as in aralkyl, such as methyl, ethyl, isopropyl, n-octyl, t-octyl, and like alkyl groups; halo substituents such as fluoro, chloro, bromo, and iodo; nitro substituents; alkoxy substituents, such as methoxy, ethoxy, nonoxy, or other substituents, such as cyano, benzyl, dimethylamino, dibutylamino, methyloctylamino, allyl, methallyl, and the like.

Typical formamidinium fluoroborates of the invention include

N,N'-diphenyl-N,N'-dimethylformamidinium fluoroborate,
N,N'-diphenyl-N,N'-diethylformamidinium fluoroborate,
N,N'-diphenyl-N,N'-dicyclohexylformamidinium fluoborate,
N,N'-diphenyl-N,N'-dipropylformamidinium fluoborate,
N,N'-diphenyl-N,N'-di-t-butylformamidinium fluoroborate,
N,N'-di-p-nitrophenyl-N,N'-dimethylformamidinium fluoborate,
N,N'-dinaphthyl-N,N'-dimethylformamidinium fluoborate,
N,N'-di-o-bromophenyl-N,N'-dimethylformamidinium fluoborate,
N,N'-di-m-ethoxyphenyl-N,N'-domethylformamidinium fluoborate,
N,N'-di-2,3-xylidyl-N,N'-dimethylformamidinium fluoborate,
N,N'-di-p-tolyldyl-N,N'-dimethylformamidinium fluoborate,
N,N'-dimethylphenyl-N,N'-diisopropylformamidinium fluoborate,
N,N'-diphenyl-N,N'-dioctylformamidinium fluoborate, and
N,N'-di-p-nitrophenyl-N,N'-dioctadecylformamidinium fluoborate.

The method for preparing the formamidinium fluoborates of the invention comprises reacting a tri-N-aryl-N-alkylaminomethane of the formula

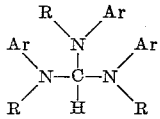

in which Ar and R are defined above, with a BF$_4$-generating compound, such as fluoboric acid, it is advantageous, but not essential, to carry out the reaction in the presence of an inert solvent, such as water alone and/or a water-soluble inert solvent. Known water-soluble solvents which are inert in the reaction are suitable, such as the alkanols, ethanol, 1,2-dimethoxyethane, tetrahydrofuran, and the like.

The reaction of the tri-N-aryl-N-alkylaminomethanes is advantageously carried out in the temperature range of about 0° to 200° C. and short of the decomposition temperature of the formamidinium salts. Preferably, the temperature ranges from 50° to 100° C. The reaction may be carried out at atmospheric, supra or reduced pressures. The progress of the reaction may be followed by the consumption of a BF$_4$-generating compound. To insure completeness of the reaction, further heating may be carried out. When the products are insoluble ni the reaction mixture, they may be separated by filtration and, if desired, they may be further purified by known methods, such as by recrystallization from a solvent.

In the reaction between the tri-N-aryl-alkylaminomethanes and the BF$_4$-generating compound, it is preferred to employ two moles of BF$_4$-generating compound per mole of aminomethane; conveniently excesses as 50 to 100 or more, as over two moles, of the BF$_4$-generating compound may be used.

The formamidinium fluoborates of the invention are useful compounds as the active ingredients as pesticides, particularly as fungicides and herbicides. The compounds of the invention are of particular interest as post-emergence herbicides. Mustard and millet are sprayed two weeks after planting with N,N'-diphenyl-N,N'-dimethyl-formamidinium fluoborate at a rate of 10 pounds per acre. After two weeks, a 100% kill of the mustard and an 80% kill of the millet occurred.

In agricultural applications, the formamidinium fluoborates of the invention can be formulated in the form of dusts or powders. Concentrations of 1 to 20% may be used. Solvent solutions may also be prepared. Solutions in water-immiscible solvents, such as acetone or dioxane may be made and blended into water before spraying. The formamidinium fluoborates may also be taken up in solvents, such as methylated naphthalenes, kerosene or xylene with or without emulsifying agents.

Moreover, the formamidinium fluoborates are useful in a number of chemical reactions. They particularly lend themselves to the reaction with an alkaline metal salt of a trihaloacidic acid, such as with sodium trichloroacetate to give a trihalomethyltriaminomethane, such as trichloromethyldiaminomethane. Also, the formamidinium fluoborates lend themselves to reaction with a primary amine in the presence of an alkali hydride, such as with N-methylaniline and sodium hydride to give aryldialkylformamidines of the formula

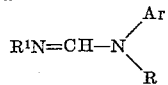

where Ar is preferably aryl, such as phenyl, R is preferably methyl, and R¹ is preferably ethyl or butyl. Also, the formamidinium fluoroborates lend themselves to the reaction with amides in the presence of alkaline hydrides, such as with benzamide in the presence of sodium hydride to give arylalkylacylformamidines of the formula

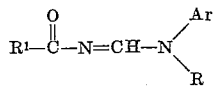

where Ar is preferably phenyl and where R is preferably methyl, and R¹ is preferably ethyl.

The invention is further illustrated by the following non-limiting examples:

Example 1

In a one-liter Erlenmyer flask there was placed 60 parts of 48% fluoboric acid diluted with 200 parts of water. To this mixture there is added 30 parts of N,N',N''-triphenyl-N,N',N''-trimethyltriaminomethane and the mixture is heated one-half hour on a steam bath until no more solid remains. Six-hundred parts of water are added and heating is continued for one hour. The temperature rises to 85° C., only little oil remaining. Supernatant liquid is decanted and the filtrate is cooled slowly to a temperature of 45° C. and then cooled in an ice bath. Filtration yields 21 parts of N,N'-diphenyl-N,N'-dimethylformamidiniumfluoroborate, M.P. 115°–118° C. Upon further recrystallization, the fluoroborate has a M.P. of 117°–119° C.

The product contains 57.90% carbon (theoretical 57.72%), 5.29% hydrogen (theoretical 5.49%), 8.98% nitrogen (theoretical 8.98%).

Example 2

Following the procedure of Example 1, there is reacted N,N',N'' - triphenyl - N,N',N'' - triethyltriaminomethane with 50 parts of fluoboric acid in water. The product is N,N''-diphenyl-N,N'-diethylformamidinium fluoborate.

Example 3

Following the procedure of Example 2, there is reacted N,N',N'' - trioctyl - N,N',N'' - triphenyltriaminomethane with 40 parts of fluoboric acid to give N,N'-diphenyl-N,N'-dioctylformamidinium fluoborate.

Example 4

A mixture of one part of N,N',N''-tri-p-nitrophenyl-N,N',N''-trimethyltriaminomethane is dissolved in 10 parts of fluoboric acid by gently warming on a steam bath. The solution is cooled in ice for one-half hour, filtered, and the precipitate is washed with 10 parts water and then rapidly dried under vacuum. There is collected 0.5 part of N,N'-di-p-nitrophenyl-N,N'-dimethylformamidinium fluoborate which after recrystallization from 50% fluoboric acid melts at 159°–161° C.

Example 5

Following the procedure of Example 4, there is reacted N,N',N'' - tri - m - ethoxyphenyl - N,N',N'' - trimethyltriaminomethane with 10 parts of fluoboric acid to give N,N' - di - m - ethoxyphenyl - N,N' - dimethylformamidinium fluoborate.

Example 6

Following the procedure of Example 5, there is reacted N,N',N'' - tri - α - naphthyl - N,N',N'' - trimethyltriaminomethane with 10 parts of fluoboric acid. The product which is obtained is N,N'-di-α-naphthyl-N,N'-dimethylformamidinium fluoborate.

This application is a continuaiton-in-part of Serial No. 89,900, filed February 17, 1961.

I claim:
1. A method for preparing formamidinium fluoborates of the formula

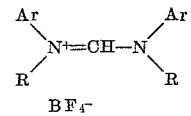

in which R is an alkyl group of 1 to 8 carbon atoms and Ar is an aryl group selected from the class consisting of phenyl, naphthyl and aralkyl, which comprises reacting a tri-N-aryl-N-alkylaminomethane of the formula

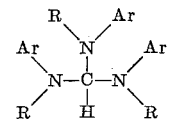

in which R and Ar are defined above with fluoboric acid.

2. The method of claim 1 in which Ar is an aromatic hydrocarbon group selected from the group consisting of phenyl, naphthyl and aralkyl, said group being substituted with an inert substituent selected from the group consisting of alkyl, fluoro, chloro, bromo, iodo, nitro, alkoxy, cyano, allyl, dimethylamino, dibutylamino, and methyloctylamino.

3. The method of claim 1, in which R is a lower alkyl group and Ar is a phenyl group.

4. A method for preparing the formamidinium fluoborates of claim 3 which comprises reacting a tri-N-aryl-N-alkylaminomethane of the formula

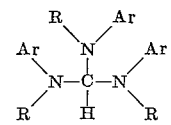

in which R is a lower alkyl group and Ar is phenyl with fluoboric acid at a temperature in the range of 0° to 200° C.

5. The process of claim 3 in which the temperature is 50° to 100° C.

6. A process for preparing N,N'-diphenyl-N,N'-dimethylformamidinium fluoborate which comprises reacting N,N',N'' - triphenyl - N,N',N'' - trimethyltriaminomethane with fluoboric acid at a temperature in the range of 50° to 100° C.

7. A process for the preparation of N,N'-di-p-nitrophenyl-N,N'-dimethylformamidinium fluoborate which comprises reacting N,N',N''-tri-p-nitrophenyl-N,N',N''-trimethyltriaminomethane with fluoboric acid at a temperature in the range of 50° to 100° C.

8. A process for the preparation of N,N'-diphenyl-N,N'-diethylformamidinium fluoborate which comprises reacting N,N',N''-triethyl-N,N',N''-triphenylaminomethane with fluoboric acid at a temperature range of 50° to 100° C.

9. The method of claim 1 in which Ar is a xylidyl substituent.

References Cited in the file of this patent
FOREIGN PATENTS 1,058,618 France _____ Nov. 4, 1953

OTHER REFERENCES

Grunfeld: Bull, Soc. Chim. France, 4th Series, Vol. 4, pp. 654–664 (1937), QD 154.

Shigorin et al.: C.A., Vol. 43, pp. 6681–6682 (1949), QD 1A51c2.

Mandel et al.: J.A.C.S., Vol. 76, 3978–3892 (1954), QD 1A5.

Ardashev: C.Q., Vol. 53, p. 1348 (1959) QD 1A51c2.

Arnold: C.A., Vol. 53, pp. 4120–4121 (1959), QD 1A51c2.

Bredereck et al.: Ber. Deut. Chem., Vol. 92, pp. 837–849 (1959), QD 1D4.